Aug. 22, 1961     A. C. PURPURA     2,997,258
HELICOPTER TYPE AIRCRAFT
Filed Jan. 22, 1957     2 Sheets-Sheet 1
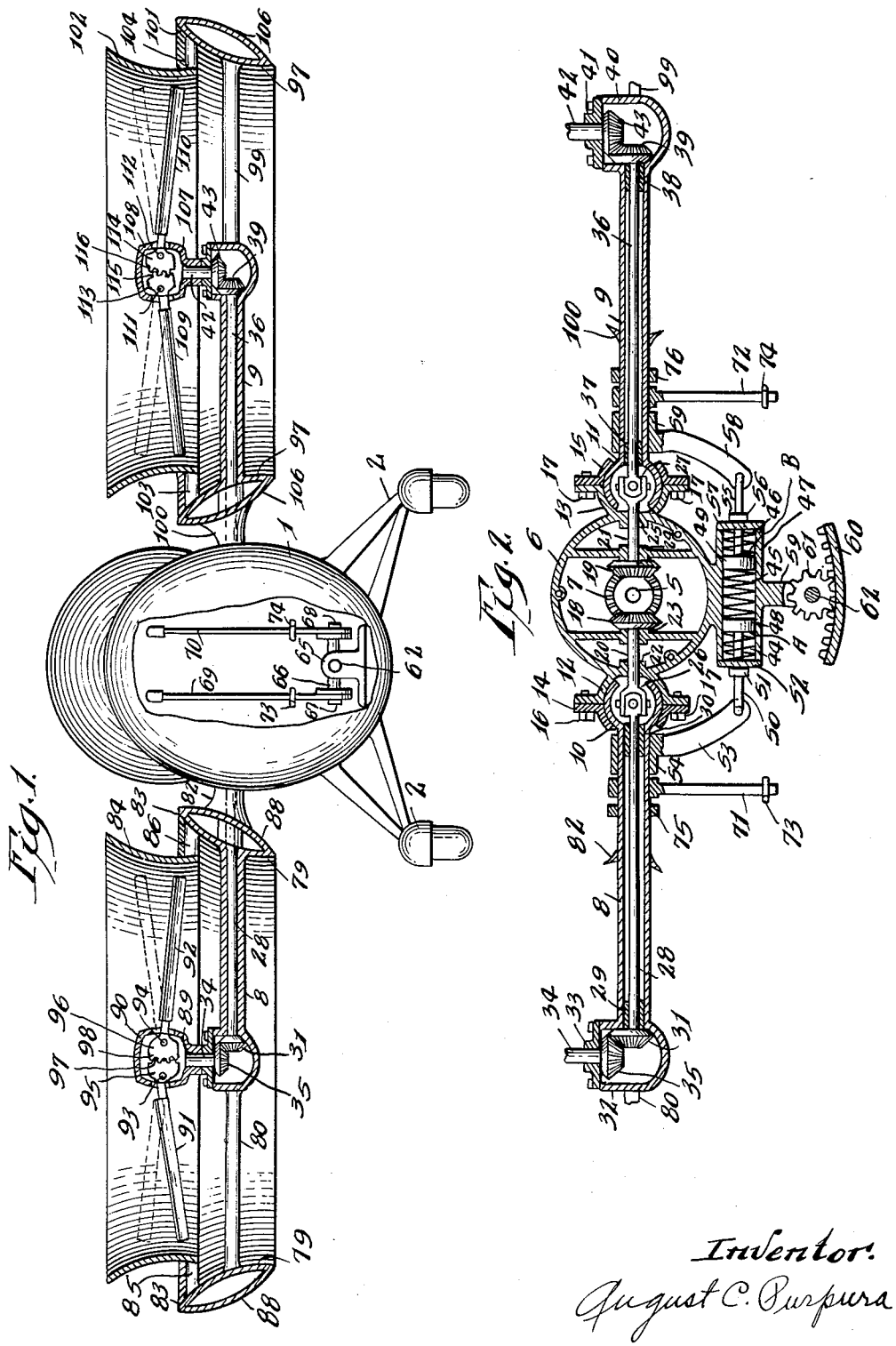
Inventor:
August C. Purpura Aug. 22, 1961 A. C. PURPURA 2,997,258
HELICOPTER TYPE AIRCRAFT Filed Jan. 22, 1957 2 Sheets-Sheet 2

Inventor.
August C. Purpura

United States Patent Office

2,997,258
Patented Aug. 22, 1961

2,997,258
HELICOPTER TYPE AIRCRAFT
August C. Purpura, 1559 N. 5th Ave., Melrose Park, Ill.
Filed Jan. 22, 1957, Ser. No. 635,252
6 Claims. (Cl. 244—23)

The invention relates to a new and novel type of aircraft which will operate in vertical and horizontal flight as well as hover without any forward speed.

The object of the invention is to produce an aircraft which will perform more efficiently than the conventional helicopter in vertical flight and which will be capable of speeds up to 200 miles per hour in forward flight.

Another object of the invention is to produce an aircraft which will be simple and inexpensive to manufacture and which can be easily and sofely flown.

The present invention uses a new and novel method of creating lift and thrust by operating a propeller within double bellmouth curved ducts. It is a known fact that propellers operating within bellmouth curved ducts deliver more than 30 percent more thrust or lift than propellers operating in the open air. I propose to increase this efficiency still further by employing double bellmouth curved ducts mounted one above the other thus the airstream entering the lower duct creates a partial vacuum at the bellmouth curved opening located at the top of said lower duct thereby creating additional lift.

Another object of the invention is the construction of a propeller that has two pivoted propeller blades that are geared together near the hub so that both propeller blades are free to move up and down in unison in relation to the propeller hub in response to thrust and centrifugal force.

Another object of the invention is a simplified control system for flying the craft.

Another object of the invention is the construction of universal jointed shafts for driving individual propellers located on each side of the fuselage by a single engine mounted within the fuselage.

The various features of novelty whereby my invention is characterized will hereinafter be pointed out with particularity in the claims; but for a full understanding of the invention and of its various objects and advantages, including those just enumerated, reference may be had to the following detailed description taken in connection with the accompanying drawings.

Referring to the drawings:

FIG. 1 is a front elevational view of an aircraft that embodies my invention showing the air ducts and propellers in position for vertical flight.

FIG. 2 is a partial sectional view of the power transmission and housing and air ducts supporting means.

Figure 3:
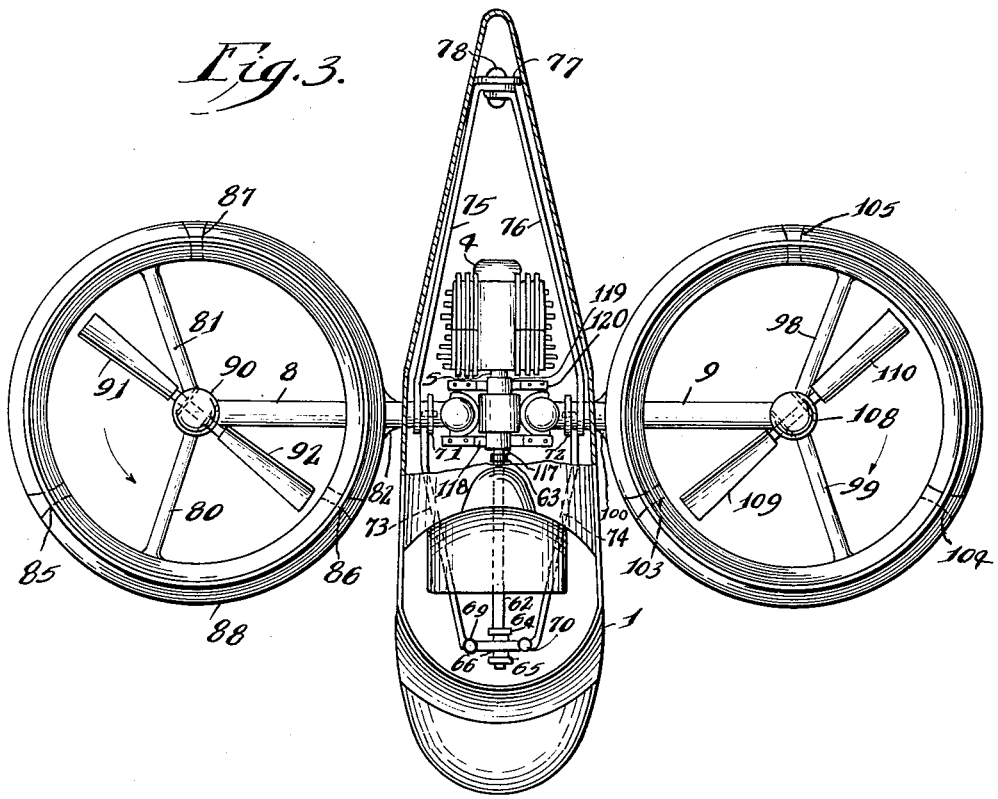
FIG. 3 is a top plan view of such aircraft.
Figure 4:
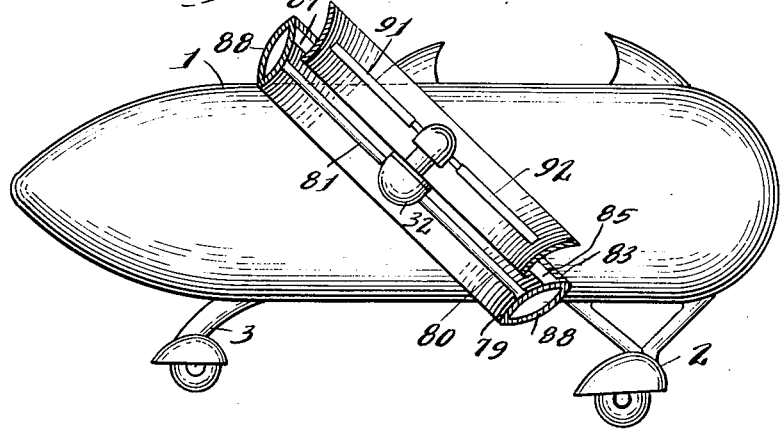
FIG. 4 is a side elevational view of said aircraft showing the air ducts and propellers shifted in the position for obtaining forward flight.

Part 1 is a conventional fuselage having the usual landing gear 2, and tail wheel 3. The engine 4 is mounted in the rear portion of the fuselage 1. Mounted on the engine shaft 5 that extends into the power transmission housing 6 is a bevel gear 7; on each side of the transmission housing 6 and connected thereto are hollow sleeves 8 and 9. The inner ends of sleeves 8 and 9 are formed into ball shaped bearings 10 and 11; these ball shaped bearings fit snugly into the circular supports 12 and 13 that is casted integral on each side of the transmission housing 6 and are held thereto by flanges 14 and 15 and secured thereto by screws 16 and 17. Within the housing 6 are bevel gears 18 and 19 that are in mesh with the bevel gear 6. The bevel gear 18 is mounted on a short shaft 20 and the bevel gear 19 is mounted on short shaft 21. The short shaft 20 is journaled in bearings 22 and 23 and shaft 21 is journaled in bearings 24 and 25. On the outer ends of shafts 20 and 21 are universal joints 26 and 27. A long shaft 28 extends through hollow sleeve 8 and is journaled in bearings 29 and 30. The inner end of shaft 28 is connected to universal joint 26. On the outer end of shaft 28 is mounted a bevel gear 31. Mounted on the end of propeller shaft 34 that extends within the gear housing 32 is a bevel gear 35. The bevel gear 35 is in mesh with and driven by another bevel gear 31 mounted on the end of shaft 28.

A long shaft 36 extends through hollow sleeve 9 and is journaled in bearings 37 and 38. The inner end of shaft 36 is connected to universal joint 27. On the outer end of shaft 36 is mounted a bevel gear 39. Mounted on the end of hollow sleeve 9 is gear housing 40, secured to the top of gear housing 40 is bearing 41, journaled in bearing 41 at right angle to shaft 36 is propeller shaft 42 that extends into the gear housing 40. On the end of propeller shaft 42 that extends into the gear housing 40 is mounted a bevel gear 43 that is in mesh with and driven by bevel gear 39.

It can be seen that the universal joints 26 and 27 permit the hollow sleeves 8 and 9 to shift either up and down on ball joints 10 and 11.

The 2 hollow sleeves 8 and 9 are held constantly in a straight line by springs 44, 45, and 46. This is accomplished as follows: casted integral with transmission housing 6 is a hydraulic cylinder 47, within said cylinder 47 are sliding fit pistons 48 and 49, on piston 48 is secured a connecting rod 50 that slides through a tight fitting bearing 51 on cylinder cap 52. The connecting rod 50 is pivotally connected to an arm 53, that has a bearing 54 that has a loose fit on hollow sleeve 8 whereas the sleeve 8 is free to turn without turning the arm 53.

The piston 49 in hydraulic cylinder is secured to connecting rod 55 that slides through a tight fitting bearing 56 on cylinder cap 57. The connecting rod 55 is pivotally connected to an arm 58 that has a bearing 59 that has a loose fit on hollow sleeve 9 whereas the sleeve 9 is free to turn without turning the arm 53.

There is a heavy spring 44 between cap 52 and piston 48 and there is a heavy spring 45 within the cylinder between the piston 48 and 49 and there is also a heavy spring 46 between the piston 49 and cap 57.

The springs 44, 45, and 46 are so tensioned so as to hold both sleeves 8 and 9 in a straight line. To retard the action of the springs 44, 45, and 46 on pistons 48 and 49 the cylinder 47 is filled with special hydraulic fluid. This fluid must pass through small holes A and B in pistons 48 and 49. Thereby slowing the action of the springs 44, 45, and 46 against the pistons 48 and 49.

The transmission housing 6 is pivotally supported by circular members 117 and 119 fastened on the front and rear ends respectively of the transmission 6. The circular member 117 is journaled in bearing 118 and circular member 119 is journaled in bearing 120. The engine shaft 5 and the transmission supporting members 117 and 119 are in perfect alignment.

It can be seen that the construction of my invention permits the tilting of the transmission housing assembly for stabilizing the aircraft in flight. The tilting of the transmission housing 6 from the pilot's cockpit is accomplished as follows: On the bottom portion of transmission housing 6 which is an extension of the transmission housing 6 is an arm 59, on the extreme bottom end of the arm 59 is secured a partial internal gear 60. In mesh with said internal gear 60 is a small gear 61 that is mounted on the end of shaft 62. The shaft 62 is supported at one end by a bearing 63.

The shaft 62 extends in length to the cockpit located at the front end of the fuselage 1. The front end of the shaft 62 is supported in bearings 64 and 65. There is secured to shaft 62 a member 66 located between bearings 64 and 65, on each side of the member 66 and pivotally connected thereto by screws 67 and 68 are two control sticks 69 and 70. By tilting both control sticks 69 and 70 either to the left or right, the member 66 thereby turns the shaft 62 and then the gear 61 secured to shaft 62 turns the partial internal gear 60 thereby tilting the entire transmission housing assembly 6. However this manual control of the tilting of the transmission assembly does not interfere with the independent tilting of the hollow sleeves 8 and 9 by air currents during flight in rough weather.

Control means are also provided for turning the hollow sleeves 8 and 9. This is accomplished by the arms 71 and 72 that are tightly secured and locked to the sleeves 8 and 9. The arm 71 is connected to control stick 69 by connecting rod 73 and the arm 72 is connected to control stick 70 by connecting rod 74. Thus moving controls 69 and 70 either forward or backward together or independently of each other, turns the sleeves 8 and 9.

To support the sleeves 8 and 9 so that they will not move forward or backward are the pivoted supporting arms 75 and 76 that are tightly secured at their front ends to the sleeves 8 and 9. The extreme rear ends of the arms 75 and 76 are pivotally supported by rivet 78 to a member 77 connected to fuselage 1. The arms 75 and 76 do not interfere with the free up and down movements of the sleeves 8 and 9 since the arms 75 and 76 are free to turn on rivet 78.

Mounted on the end of hollow sleeve 8 is a circular duct 79 the center of which is concentric with the center of propeller shaft 34. The duct 79 is secured to the gear housing 32 by arms 80 and 81 and is secured from the outside by flange 82 on sleeve 8. The duct 79 has a bellmouth curved opening 83 located at its top portion. Directly above duct 79 and concentric therewith is another duct 84. The bottom end of the air outlet of the duct 84 is just slightly below the bellmouth curved opening 83 on duct 79. The duct 84 is secured concentrically to the top portion of lower duct 79 by short arms 85, 86, and 87. The exterior of the duct has a streamlined outer shell 88.

The propeller assembly 89 is mounted on propeller shaft 34. The construction of the propeller assembly consists of a hub 90 having two propeller blades 91 and 92 pivotally secured to the hub 90 by pins 93 and 94. Within the hub 90 are partial circular extensions 95 and 96 of the propeller blades 91 and 92. On the outside diameter of the extensions 95 and 96 are gear teeth 97 and 98.

The teeth of partial gear 97 and the teeth of partial gear 98 are in mesh with each other so that when centrifugal force acts against the air screw actions of the blades 91 and 92 their actions will always be equalized and the position of both blades will always be the same when rotating. Thus eliminating vibration of the propeller when rotating at high speeds which would be the case if independent blade suspension were used.

Mounted on the end of hollow sleeve 9 is a circular duct 97 the center of which is concentric with the center of propeller shaft 42. The duct 97 is secured to the gear housing 40 by arms 98 and 99 and is secured from the outside by flange 100 and sleeve 9. The duct 97 has a bellmouth curved opening 101 located at its top portion. Directly above duct 97 and concentric therewith is another duct 102, the bottom end of the air outlet of the duct 102 is just slightly below the bellmouth curved opening 101 on duct 97. The duct 102 is secured concentrically to the top portion of lower duct 97 by short arms 103, 104, and 105. The exterior of the duct 97 has a streamlined outer shell 106.

The propeller assembly 107 is mounted on propeller shaft 42. The construction of the propeller assembly consists of a hub 108 having two propeller blades 109 and 110 pivotally secured to the hub 108 by pins 111 and 112. Within the hub 108 are partial circular extensions 113 and 114 of the propeller blades 109 and 110 on the outside diameter of the extensions of 113 and 114 are gear teeth 115 and 116. The teeth of partial gear 115 and the teeth of partial gear 116 are in mesh with each other so that when centrifugal force acts against the air screw action of the blades 109 and 110 their actions will always be equalized and the position of both blades will always be the same when rotating.

For the sake of brevity certain details and constructions are omitted such as cooling means for the engine and the throttle controls as any standard means for cooling and throttling the engine can be used.

Flight operations are as follows: after starting the engine and permitting it to warm up, the two control sticks 69 and 70 are placed in neutral positions, that is about midway between the full forward and rearward movement of the control sticks. The throttle of the engine is slowly opened to its full throttle position. When the propellers reach the speed of about 1700 revolutions per minute the craft will slowly begin to rise. If it is desired to hover, the pilot merely cuts the speed of the engine to about 1600 revolutions per minute. Then if it is desired to make a left hand turn while hovering the pilot merely moves the control stick 70 grasped with the left hand forward and the control stick 69 that is grasped by the right hand is moved backwardly the craft will then turn to the left. If a right hand turn is desired the control stick 69 is moved forward and the control stick 70 is moved backward the craft will then turn to the right. This method of turning the craft is used only when hovering. For forward flight from a hovering position the pilot merely moves both control sticks 69 and 70 rearward. Care must be taken not to move both control sticks backwardly too rapidly. If it is desired to make a left hand turn while in forward flight, both control sticks 69 and 70 are pushed forwardly to their neutral position and then only the right hand control stick 70 is moved rearwardly slightly from its hovering position. The craft will then automatically bank and turn to the left. When a right hand turn is desired after both control sticks 69 and 70 are neutralised and the right hand stick 69 is pushed slightly forwardly, the craft will then turn and bank automatically to the right. If it becomes necessary to stop the craft quickly while in forward flight or fly the craft in reverse the pilot merely moves both control sticks 69 and 70 forward.

When the pilot desires to land the craft he merely brings the craft to a hovering position when the landing site has been approached by merely pushing both control sticks 69 and 70 forwardly just slightly ahead of their neutral position which acts as a brake and stops forward flight quickly and then before the craft starts to fly in reverse the control sticks 69 and 70 are placed in its neutral position where the craft will hover and then the throttle control is used to cut the speed of the engine until the rate of descent desired is reached. When the ground is approached the throttle is opened slightly to cushion the craft as it touches the ground.

The principle on which the hinged propeller blades function is as follows: the position of the propeller blades when not rotating are shown in full lines in FIG. 1. The position of the propeller blades when they are rotating at low speeds is shown in dotted lines in FIG. 1. When the engine driving the propellers is speeded up, centrifugal force acting on the propeller blades force it down to about the half way mark between the position of propeller blades shown in full lines and dotted lines as shown in FIG. 1 thus imparting a lifting force to the hub of the propellers that is considerably more than the actual thrust created by the propeller if the blades of the propeller were rigidly mounted.

The purpose of the construction of my air ducts having two bellmouth curved air inlets while having only one air outlet is to obtain maximum lift and thrust with the use of minimum of power for obtaining vertical and horizontal flight.

It is thought that the invention and its attendant advantages will be understood from the foregoing description and it will be apparent that various changes may be made in the form, construction and arrangements of parts without departing from the spirit and scope of the invention or sacrificing any of its material advantages, the form hereinbefore described being merely a preferred embodiment thereof.

I claim as my invention:

1. In an aircraft, having a fuselage, a pair of ducts mounted concentrically one above the other on each side of said fuselage, said ducts having bellmouth shaped air inlets and having streamlined outside surfaces, a propeller mounted within the center of each pair of ducts, said propellers being driven in opposite directions, an engine mounted in said fuselage with its engine shaft parallel with a longitudinal axis of the fuselage, a transmission driven from the engine having a transmission housing mounted in the fuselage for pivotal movement about said engine shaft axis and mechanically connected to the propellers within said ducts, and means for shifting said ducts and propellers as a unit rotatable about a horizontal axis and transverse to the fuselage for obtaining maximum lift without forward speed, and for shifting the ducts and propellers on said horizontal axis for maintaining minimum lift and maximum forward thrust.

2. In an aircraft having a fuselage, an engine mounted within said fuselage with its engine shaft parallel with a longitudinal axis of the fuselage, a transmission driven from the engine having a transmission housing mounted in the fuselage for pivotal movement about said engine shaft axis, two hollow ball jointed sleeves connected to said transmission, each of said ball jointed sleeves extending beyond each side of said fuselage, an engine driven shaft within each of said ball jointed hollow sleeves, a propeller shaft driven by each engine driven shaft, a propeller mounted on each propeller shaft, a shroud surrounding each propeller and secured to its hollow ball jointed sleeve, and means for turning the hollow ball jointed sleeves for shifting the propellers and shrouds for obtaining vertical or horizontal flight.

3. In a helicopter type of aircraft having a fuselage, an engine mounted within said fuselage with its engine shaft parallel with the longitudinal axis of the fuselage, a transmission driven from the engine having a transmission housing mounted in the fuselage for pivotal movement about said engine shaft axis, two hollow sleeves pivotally secured to the transmission housing and extending out of each side of said fuselage, engine driven shafts journaled within said hollow sleeves, a propeller driven by each engine driven shaft, a pair of bellmouth shaped shrouds surrounding each propeller, and manual means for rocking said transmission housing on its pivoted members.

4. In a helicopter type of aircraft having a fuselage, an engine mounted within the fuselage with its engine shaft parallel with the longitudinal axis of the fuselage, a transmission driven from the engine having a transmission housing mounted in the fuselage for pivotal movement about said engine shaft axis, two ball jointed hollow sleeves secured to the transmission housing for turning and swinging movements, an engine driven shaft journaled within each said ball jointed sleeve, a propeller driven by each engine driven shaft, a pair of bellmouthed shaped shrouds surrounding each propeller and secured to the exterior of the ball jointed sleeves whereas turning the sleeves on their ball joints simultaneously turns the propellers and shrouds with respect to the fuselage in relation to flight for obtaining vertical and forward flight.

5. In a helicopter type of aircraft having a fuselage, an engine mounted within said fuselage with its engine shaft parallel with the longitudinal axis of the fuselage, a transmission driven from the engine having a transmission housing mounted in the fuselage for pivotal movement about said engine shaft axis, two ball jointed sleeves secured to the transmission housing for turning and swinging movements, engine driven shafts journaled within the ball jointed sleeves, a propeller driven by each engine driven shaft mounted in the ball jointed sleeves, a pair of bellmouth shaped shrouds having two bellmouth shaped air inlets and a single air outlet surrounding each propeller, said shrouds being secured to the hollow ball jointed sleeves whereas turning said hollow sleeves on their ball joints simultaneously turns the shrouds and propellers with respect to the fuselage in positions for obtaining vertical and forward flight, and a manual control member for turning each ball jointed hollow sleeve, said control members being operable either together or independently of each other.

6. In an aircraft having a fuselage, an engine mounted within the fuselage, with its engine shaft parallel with a longitudinal axis of the fuselage, a transmission driven from the engine having a transmission housing mounted in the fuselage for pivotal movement about said engine shaft axis, two hollow sleeves secured to the transmission housing, each hollow sleeve extending beyond each side of said fuselage, an engine driven shaft within each hollow sleeve, a propeller shaft driven by each engine driven shaft, a propeller mounted on each propeller shaft, said propeller shafts supported on bearings secured to the outer ends of the hollow sleeves and means for manually rocking said pivoted transmission housing and hollow sleeves and propellers as a unit about said engine shaft axis and means for rotating said propellers about an axis transverse to the fuselage for banking and stabilizing the aircraft while in flight.

References Cited in the file of this patent
UNITED STATES PATENTS

| | | |
|---|---|---|
| 1,421,699 | Lindsay | July 4, 1922 |
| 1,802,860 | Zwinkel | Apr. 28, 1931 |
| 1,862,481 | Glenwright | June 7, 1932 |
| 2,696,953 | Lippisch | Dec. 14, 1954 |
| 2,780,424 | Price | Feb. 5, 1957 |